(12) United States Patent
Halbur et al.

(10) Patent No.: US 8,152,058 B2
(45) Date of Patent: Apr. 10, 2012

(54) TRANSACTION PRODUCT ASSEMBLY WITH MECHANICAL PRODUCT

(75) Inventors: Ted C. Halbur, Lino Lakes, MN (US); Adam W. Reynolds, Minneapolis, MN (US); Julie E. Hoppner, Minneapolis, MN (US); Adam D. Hoppus, Richfield, MN (US); Jessica D. Albrecht, Woodbury, MN (US); Robert J. Frederico, Louisville, KY (US)

(73) Assignee: Target Brands, Inc., Minneapolis, MN (US)

( * ) Notice: Subject to any disclaimer, the term of this patent is extended or adjusted under 35 U.S.C. 154(b) by 243 days.

(21) Appl. No.: 12/610,301

(22) Filed: Oct. 31, 2009

(65) Prior Publication Data

US 2011/0101090 A1 May 5, 2011

(51) Int. Cl.
  *G06K 5/00* (2006.01)
(52) U.S. Cl. .................................. 235/380; 235/494
(58) Field of Classification Search .................. 235/494, 235/380
  See application file for complete search history.

(56) References Cited

U.S. PATENT DOCUMENTS

| | | | |
|---|---|---|---|
| 1,396,289 A | 11/1921 | Scott | |
| 1,400,942 A | 12/1921 | De Haven | |
| D61,305 S | 8/1922 | Hopkins | |
| D61,327 S | 8/1922 | Powers | |
| 1,514,824 A | 11/1924 | Bailey | |
| 1,522,154 A | 1/1925 | Strauss | |
| D82,489 S | 8/1930 | Davis | |
| 1,796,483 A | 3/1931 | Schoder | |
| D86,406 S | 3/1932 | Peterson | |
| 1,959,493 A | 5/1934 | Muller | |
| 2,027,759 A | 1/1936 | Anderson | |
| D105,800 S | 8/1937 | Manske | |
| 2,638,709 A | 5/1953 | Mason | |
| 2,971,289 A | 2/1961 | Reed et al. | |
| 3,178,853 A | 4/1965 | Greenwood et al. | |
| 3,940,879 A | 3/1976 | Glass et al. | |
| 4,102,067 A | 7/1978 | Tarrant | |
| D249,086 S | 8/1978 | Tancredi | |
| 4,213,531 A | 7/1980 | Rae | |
| D271,676 S | 12/1983 | Ivy | |
| 4,530,672 A | 7/1985 | Yoneda | |
| 4,848,577 A | 7/1989 | Hoffman et al. | |
| 5,139,454 A | 8/1992 | Earnest | |

(Continued)

OTHER PUBLICATIONS

"GO-Tag™ Solution," firstdata.com, 2008, 2 pages.

(Continued)

*Primary Examiner* — Kristy A Haupt
(74) *Attorney, Agent, or Firm* — Griffiths & Seaton PLLC

(57) ABSTRACT

A transaction product assembly includes a transaction product, a mechanical article, and a coupling member. The transaction product includes an account identifier statically connected thereto. The account identifier links the transaction product to at least one of an account and a record and is machine readable by a point-of-sale terminal. The mechanical article includes a body, an auxiliary member, and an actuating mechanism. The actuating mechanism extends from within the body to a position external to the body. User interaction with the actuating mechanism is configured to induce movement of the auxiliary member relative to the body of the mechanical article. The coupling member is secured to the mechanical article and configured to be secured to the transaction product such that movement of the auxiliary member relative to the body causes corresponding movement of the transaction product. Other cards, combinations and associated methods are also disclosed.

24 Claims, 12 Drawing Sheets

U.S. PATENT DOCUMENTS

| | | | |
|---|---|---|---|
| D377,507 S | 1/1997 | Thomas, Sr. | |
| 5,881,482 A | 3/1999 | Goldman | |
| 6,523,285 B1 | 2/2003 | Gilson et al. | |
| 6,752,683 B1 | 6/2004 | Godfrey | |
| D505,450 S | 5/2005 | Lauer et al. | |
| 7,275,683 B2 | 10/2007 | Lazarowicz et al. | |
| D572,775 S | 7/2008 | Gibson | |
| D573,182 S | 7/2008 | Ricketts et al. | |
| 2008/0119952 A1 | 5/2008 | Smith et al. | |
| 2009/0108079 A1 | 4/2009 | Reynolds et al. | |
| 2009/0166437 A1* | 7/2009 | Reynolds et al. | 235/494 |

OTHER PUBLICATIONS

ABC Antiques, Win-Up Toy Talking Dog, "http://pages.abcantique.com/cgi-bin/google.fcgi?itemKey=1922647352;store=%2Fstores%2Fabca...," publicly available at least as early as Jun. 11, 2007, 5 pages.

Office Playground, Wind-Up Wild Animals, http://wwww.officeplayground.com/animals.html, publicly available at least as early as Jun. 11, 2007.

* cited by examiner

TRANSACTION PRODUCT ASSEMBLY WITH MECHANICAL PRODUCT

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product assembly including a transaction product, a mechanical article, and a coupling member. The transaction product includes an account identifier statically connected thereto. The account identifier links the transaction product to at least one of an account and a record and is machine readable by a point-of-sale terminal. The mechanical article includes a body, an auxiliary member, and an actuating mechanism. The actuating mechanism extends from within the body to a position external to the body. User interaction with the actuating mechanism is configured to induce movement of the auxiliary member relative to the body of the mechanical article. The coupling member is secured to the mechanical article and configured to be secured to the transaction product such that movement of the auxiliary member relative to the body causes corresponding movement of the transaction product. Stored-value cards, methods of providing a transaction card, and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention provides examples and is not intended to limit the invention or the application and uses of the invention. Furthermore, there is no intention to be bound by any theory presented in the preceding background of the invention or the following detailed description of the invention.

A stored-value card assembly or other transaction product assembly is adapted to facilitate making purchases of goods and/or services at, for example, a retail store or web site. According to one embodiment, an original consumer buys a transaction product assembly to give a recipient who in turn is able to use it to pay for goods and/or services. A transaction product assembly, according to embodiments of the present invention, provides the consumer and recipient with extra amusement and functionality in addition to the ability to pay for goods and/or services with the associated transaction product.

In particular, according to one embodiment, the transaction product assembly includes a transaction card or other transaction product and a mechanical article, such as an amusing wind-up toy. In one embodiment, transaction product assembly is packaged in a manner substantially enclosing both the transaction card and the mechanical article while still allowing actuation and movement of the mechanical article. In this manner, the workings of the mechanical article are displayed to potential consumers in a manner providing an entertaining effect and encouraging purchase of the transaction product assembly. For example, where the mechanical article is a wind-up toy, the wind-up knob or other actuating member is accessible outside the package and the amusing aspect of the wind-up toy (e.g., walking movement of legs of the toy) can be demonstrated without removing the wind-up toy from the packaging. In one embodiment, this amusing aspect of the transaction product assembly promotes sale, use, and/or loading of the transaction product by potential consumers and/or bearers of the transaction product assembly.

Figure 1:
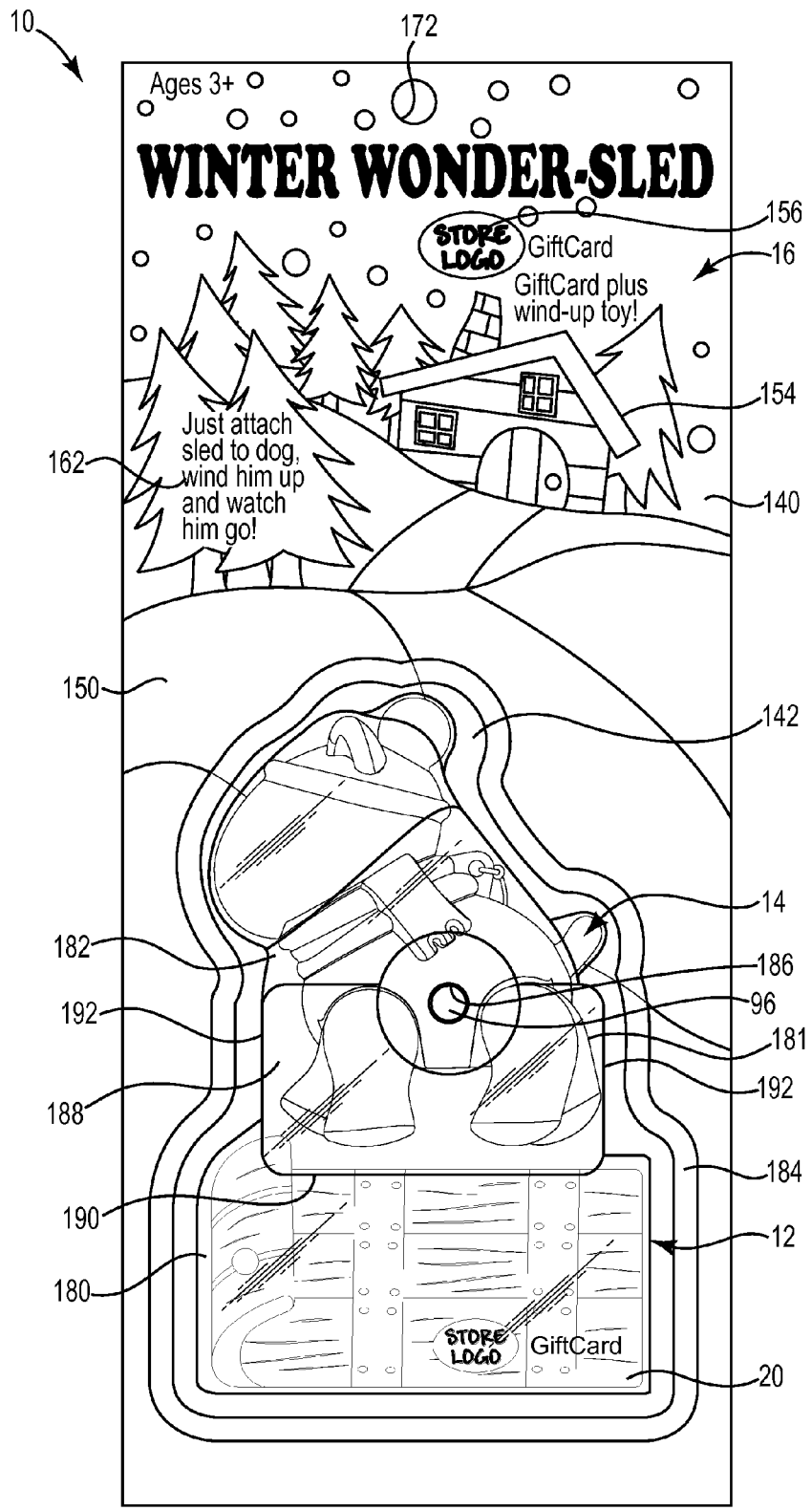
FIG. 1 is a front view illustration of a transaction product assembly, according to one embodiment of the present invention.
Figure 2:
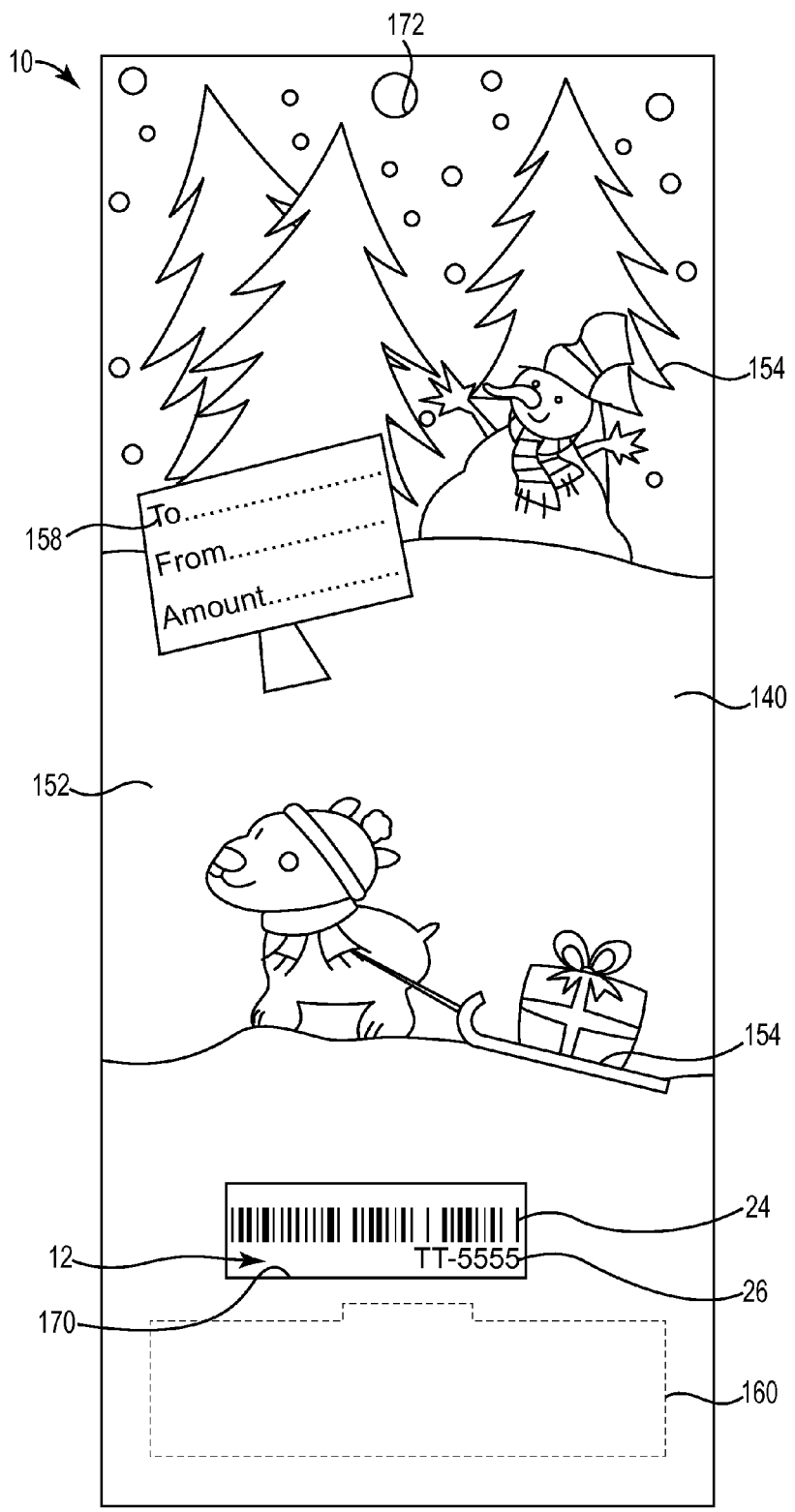
FIG. 2 is a rear view illustration of the transaction product assembly of FIG. 1, according to one embodiment of the present invention.
Figure 3:
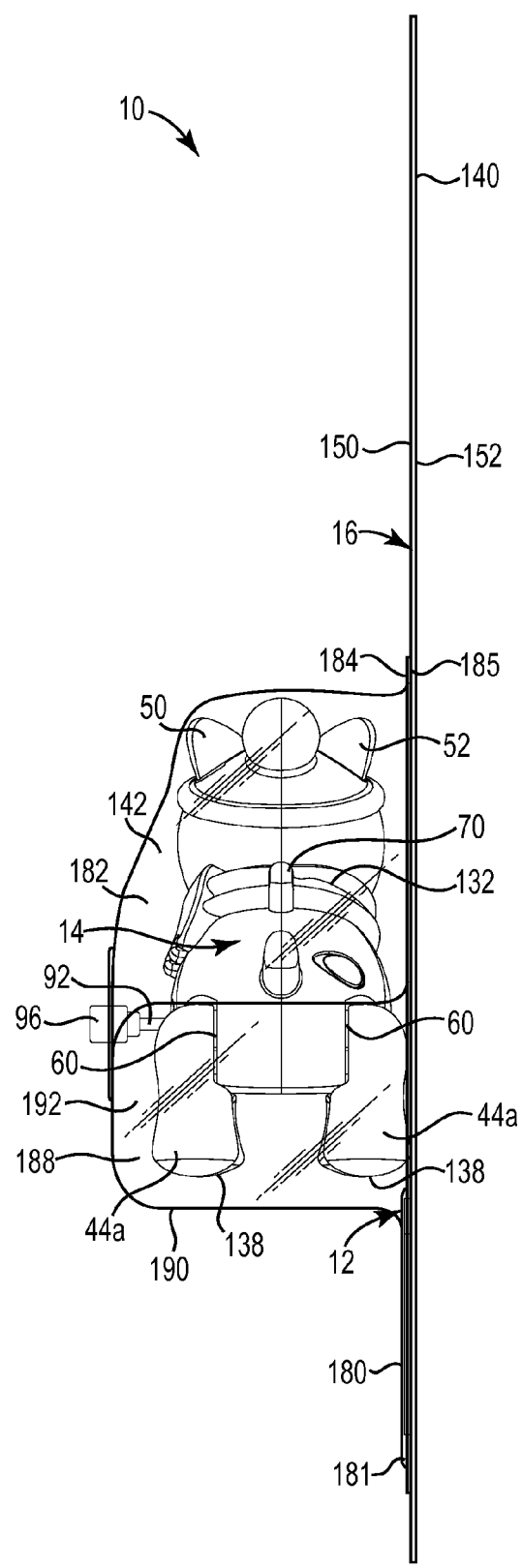
FIG. 3 is a right view illustration of the transaction product assembly of FIG. 1, according to one embodiment of the present invention.

Turning to the figures, FIGS. 1-3 illustrate various views of one embodiment of a transaction product assembly 10 including a transaction product 12, a mechanical article 14, and package 16. The transaction product 12 facilitates purchase of retail items and/or is configured to be applied toward use of pre-stored calling minutes, etc. and may be in the form of a card (e.g., gift card, calling card, credit card, or debit card) or may take any other suitable form. In one embodiment, transaction product 12 is also configured for use with mechanical article 14 in an amusing or other non-transactional manner. Mechanical article 14 is any item configured to move upon actuation of the item induced, for example, by user interaction with a switch, knob, lever, button etc. included on mechanical article 14. In one embodiment, mechanical article 14 and transaction product 12 are configured to be directly or indirectly coupled with one another such that movement of mechanical article 14 causes transaction product 12 to move as well. Package 16 is configured to substantially enclose transaction product 12 and mechanical article 14 for transport and presentation in a retail store or related setting.

Figure 4:
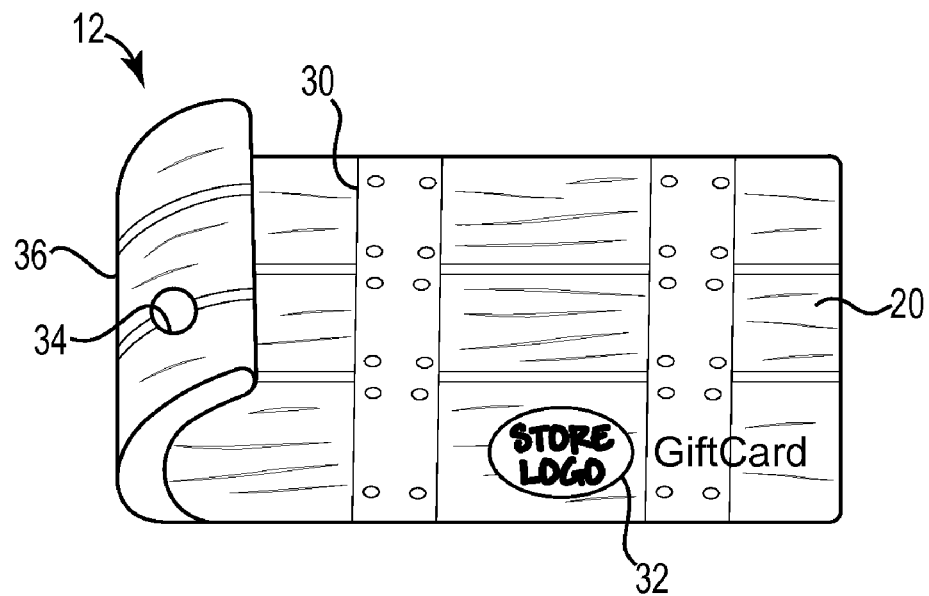
FIG. 4 is a front view illustration of a transaction product of the transaction product assembly of FIG. 1, according to one embodiment of the present invention.
Figure 5:
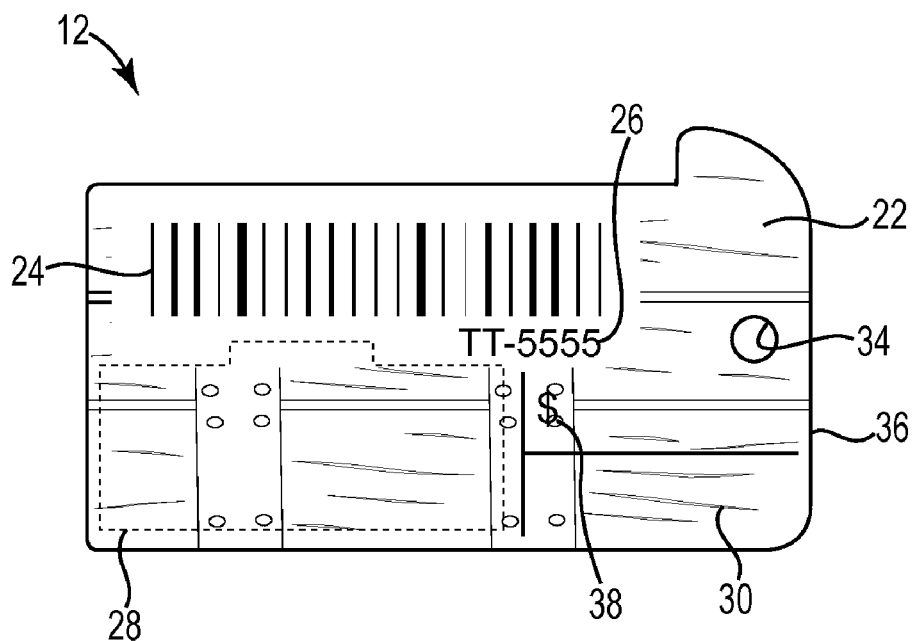
FIG. 5 is a rear view illustration of the transaction product of the transaction product assembly of FIG. 4, according to one embodiment of the present invention.

Referring to FIGS. 4 and 5, for example, transaction product 12 defines a front surface 20 (i.e., a first major surface) and a rear surface 22 (i.e., a second major surface) opposite front surface 20 separated by a thickness of transaction product 12. In one embodiment, at least one of front surface 20 and rear surface 22 is substantially planar. In one example, transaction product 12 is a card having a substantially rectangular shape, and, in one embodiment, is similarly sized to an identification card, a credit card, or other card sized to fit in a wallet of a card bearer (i.e. is wallet sized). Accordingly, in one example, each of front surface 20 and rear surface 22 are substantially rectangular and/or otherwise wallet sized. In particular, in one embodiment, the overall dimensions of transaction product 12 are less than or equal to about 8.5 cm by about 5.5 cm wide with a thickness of less than about 1 mm. In other embodiments, transaction product 12 is otherwise shaped as a square, circle, oval, star, or any other suitable shape.

Transaction product 12 is formed of any suitable substrate or combination of substrates. In one example, transaction product 12 is formed from a somewhat rigid yet flexible material in a substantially planar form. More specifically, in one embodiment, transaction product 12 is a substantially planar member formed of plastic (e.g. polycarbonate, polystyrene, polyvinyl chloride (PVC), acrylonitrile butadiene styrene (ABS), polyethylene terephthalate (PET), teslin, polyactide (PLA) or acrylic), a composite, or other suitable material. In one embodiment, transaction product 12 is cut from sheet-stock plastic material. Transaction product 12 can be formed in any other suitable planar or non-planar configuration as will be apparent to those of skill in the art upon reading this application.

Referring to the rear view illustration of FIG. 5, in one example, rear surface 22 of transaction product 12 or any other suitable portion of transaction product 12 includes at least one account activation area or account identifier 24, such as a bar code, magnetic strip, a smart chip or other electronic device, a radio frequency identification (RFID) device or other suitable identifier readily machine readable by a point-of-sale terminal or other account access station or kiosk. Account identifier 24 indicates an account or record to which transaction product 12 is linked. The account or record of the monetary or other balance on transaction product 12 optionally is maintained on a database accessible by corresponding point-of-sale terminals, other electronic or manual record-keeping system or, in the case of "smart" cards for example, on a chip or other electronic device(s) on transaction product 12 itself. Accordingly, by scanning account identifier 24, the account or record linked to transaction product 12 is identified and can subsequently be activated, have amounts debited therefrom, and/or have amounts added thereto.

In one embodiment, account identifier 24 includes a character string or code 26 (e.g., a number and/or letter string) configured to provide additional security to the user of transaction product 12 and/or configured to be read by a bearer of transaction product 12 to facilitate use of transaction product 12 for web site or other purchases outside of brick-and-mortar type retail establishments. With the above in mind, account identifier 24 is one example of means for linking transaction product 12 with an account or record, and scanning of account identifier 24 is one example of means for activating or loading value on transaction product 12. Transaction product 12 is one example of means for supporting account identifier 24.

In one embodiment, transaction product 12 includes redemption indicia 28, such as on rear surface 22 of transaction product 12. Redemption indicia 28 indicate that transaction product 12 is redeemable for the purchase of goods and/or services and that, upon use, a value of the purchased goods and/or services will be deducted from the account or record linked to transaction product 12. In one embodiment, redemption indicia 28 include phrases such as "<NAME OF STORE> GiftCard" and "This GiftCard is redeemable for merchandise or services at any of our stores or at our web site," and/or provides help or phone line information in the case of a lost, stolen, or damaged transaction product, etc.

In one embodiment, front surface 20 of transaction product 12 or other suitable portion of transaction product 12 includes one or more of characterizing indicia 30, brand indicia 32, and amount field indicia 38. Characterizing indicia 30 include any suitable graphics, text, or combinations thereof and help define transaction product 12 as an item or accessory configured for use and/or otherwise configured to visually correspond with mechanical article 14. For example, as illustrated in FIGS. 1-3, mechanical article 14 is provided in the form of a snow dog, and characterizing indicia 30 present transaction product 12 as a sled to be pulled behind the snow dog. Additional mechanical article 14 details are described below, and different characterizing indicia 30 sizes and shapes available for transaction product 12 will be apparent to those of skill in the art upon reading this application.

In one embodiment, transaction product 12 includes other features to facilitate use of mechanical article 14 with transaction product 12. As illustrated, for example, transaction product 12 includes an aperture 34 extending entirely through transaction product 12 positioned near a leading edge 36 of transaction product 12 to assist in coupling transaction product 12 to mechanical article 14 as will be further described below. Other suitable coupling features are also contemplated.

In one example, brand indicia 32 include one or more of a logo, text, trademark, etc. that associate transaction product 12 with at least one of a product, a brand, a store, department, etc. Amount field indicia 38 are configured to be marked by a bearer of transaction product 12, retail store employee, or other individual to indicate a value initially loaded transaction product 12.

Mechanical article 14 is generally provided as any one of a wide variety of mechanically actuated moveable articles. For example, as illustrated, mechanical article 14 is in the form of an animal configured to walk upon actuation by a user. In one embodiment, mechanical article 14 includes a hollow shell or body 40, a drive assembly 42, and appendage or auxiliary members, e.g., in the illustrated examples, legs 44. Body 40 substantially encloses drive assembly 42 and drive assembly 42 is coupled with legs 44, which are positioned at least partially outside body 40, to move legs 44 relative to body 40 in a desired and generally amusing and/or otherwise functional manner.

More specifically, in one embodiment, body 40 is hollow and includes two half sections such as a right or first section 50 and a left or second section 52 interfit together to define body 40 with a cavity 54 therein. For example, each of first section 50 and second section 52 includes complimentary stepped edges that abut one another upon assembly. First section 50 and/or second section 52, in one embodiment, include other suitable registration and coupling members configured to facilitate alignment and coupling of sections 50 and 52 to one another to collectively appear as a coherent body 40.

In one embodiment, each of first section 50 and second section 52 defines exterior indentations 60. More specifically, in one example, each exterior indentation 60 extends inward from both a side and a bottom of the respective one of first section 50 and second section 52. For instance, as illustrated, two indentations 60, one near a front and one near a back, are defined in each of first section 50 and second section 52 and are each configured to be positioned near where an auxiliary member will be coupled with the corresponding first section 50 and second section 52. Notably, with respect to mechanical article 14, the front of mechanical article 14 is considered the head, and rear of the mechanical article 14 is considered the tail portion in the illustrated figures. First section 50 and second section 52 each define apertures 62 extending through exterior indentations 60 and interfacing with cavity 54. In one embodiment, apertures 62 are threaded to receive coupling members, such as screws, bolts, etc. Cam reception slots 65 are also defined through sections 50 and 52 within each exterior indentation 60. Each cam reception slot 65 is elongated and spaced from one of apertures 62 formed in the corresponding exterior indentation 60. In one example, one or more of cam reception slots 65 is arcuate and concentrically positioned relative to the corresponding one of apertures 62.

Body 40 includes an opening 68, for example, through first section 50 extending from an exterior surface thereof and in communication with cavity 54. Opening 68 provides access for an actuating mechanism of drive assembly 42 as will be further described below. In one embodiment, body 40 defines a protrusion 70 with a hole 72 formed through protrusion 70. In one example, protrusion 70 is partially formed by each of first section 50 and second section 52. In one embodiment, protrusion 70 is positioned nearer a rear of body 40 than a front of body 40. In one embodiment, a coupling member, for example, a braided or other thread 132 is tied through hole 72 and around protrusion 70 and/or otherwise coupled with body 40, and is also configured to be coupled with transaction product 12.

The auxiliary member(s) are configured to couple with and generally extend from body 40. As illustrated in FIGS. 1, 3, 6, 7, and 9 in one embodiment, auxiliary members include one or more legs 44, for example, two rear legs 44a and two front legs 44b. Each leg 44 may be formed in any suitable manner. In one example, legs 44 are each formed of multiple injection-molded pieces of plastic securely coupled to one another. Legs 44 each extend from a top portion thereof to a bottom surface 138 configured to interact with a support surface 130 (FIG. 9) as will be further described below.

More specifically, in one embodiment, each rear leg 44a defines a coupling indentation 80 extending from an inner side of the corresponding rear leg 44a near or at the top end of each rear leg 44a such that an inset, vertical surface 82 is defined by each rear leg 44a. A coupling protrusion or hub 84 extends from vertical surface 82 in a direction substantially perpendicular to vertical surface 82 and away from a remainder of the corresponding rear leg 44a. Each hub 84 is hollow and, in one example, threaded to receive a screw or other connection device.

A cam member 86 extends from vertical surface 82 and, in one embodiment, is spaced from and positioned below hub 84. Cam member 86 extends substantially perpendicularly relative to vertical surface 82. In one example, cam member 86 is generally cylindrical at least near an end opposite vertical surface 82. Other placements of cam member 86 relative to hub 84 are also contemplated and will be apparent to those of skill in the art upon reading this application.

Front legs 44b are each substantially similar to one another. Like rear legs 44a, each of front legs 44b defines a vertical surface 87 inset from a side of each front leg 44b at and/or near a top end of each front leg 44b. In one embodiment, a cavity 88 is defined extending into front leg 44b from and open to vertical surface 87. In one example, cavity 88 is threaded to receive a screw or other suitable connection member. A cam member 89 also extends from vertical surface 87 and, in one embodiment, is spaced from and positioned above cavity 88. Cam member 89 extends substantially perpendicularly relative to vertical surface 87. In one example, cam member 89 is generally cylindrical at least near an end opposite vertical surface 87. Other placements of cam member 89 relative to cavity 88 are also contemplated and will be apparent to those of skill in the art upon reading this application.

Figure 6:
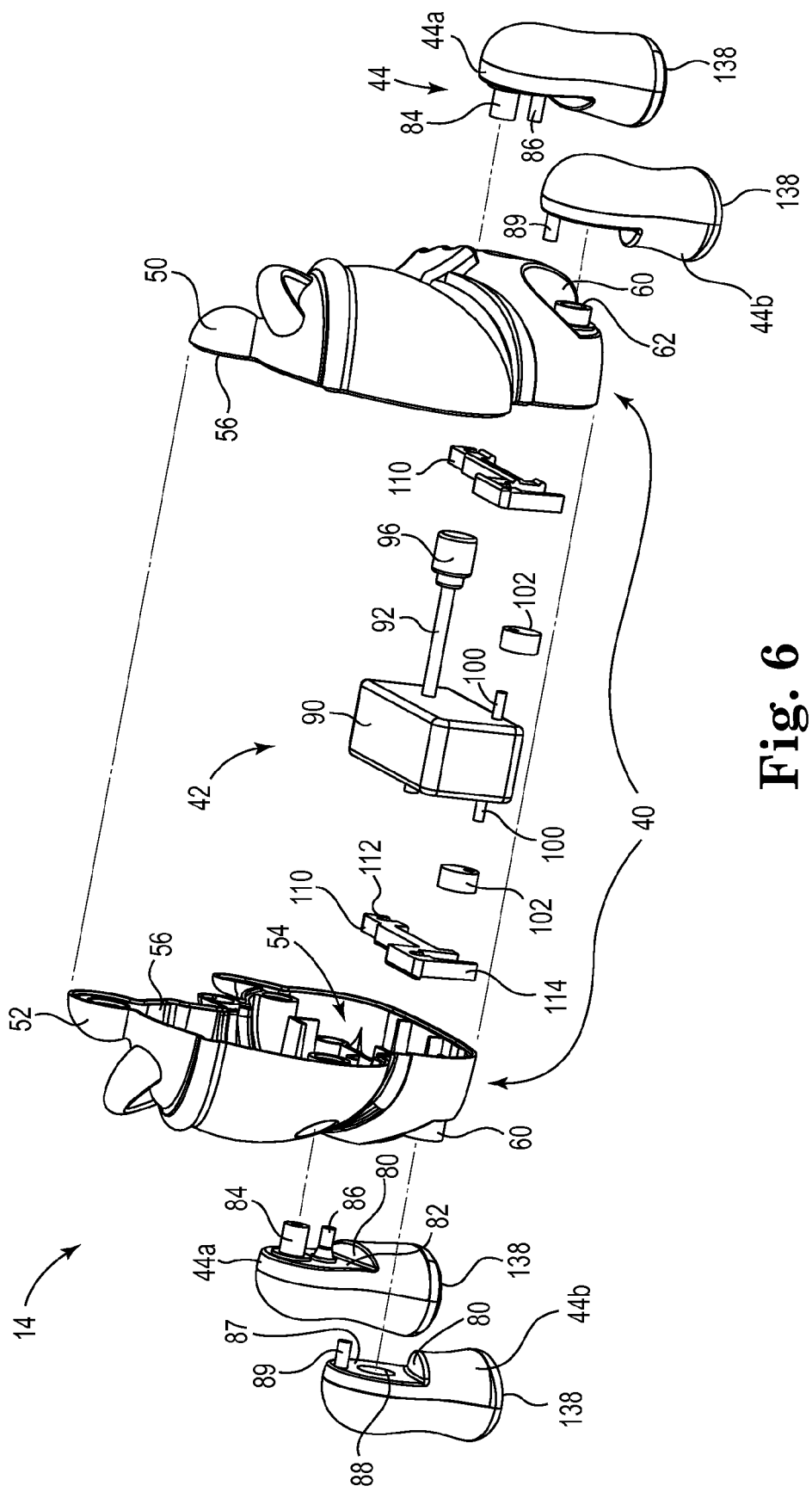
FIG. 6 is an exploded, perspective view illustration of a mechanical article of the transaction product assembly of FIG. 1, according to one embodiment of the present invention.
Figure 7:
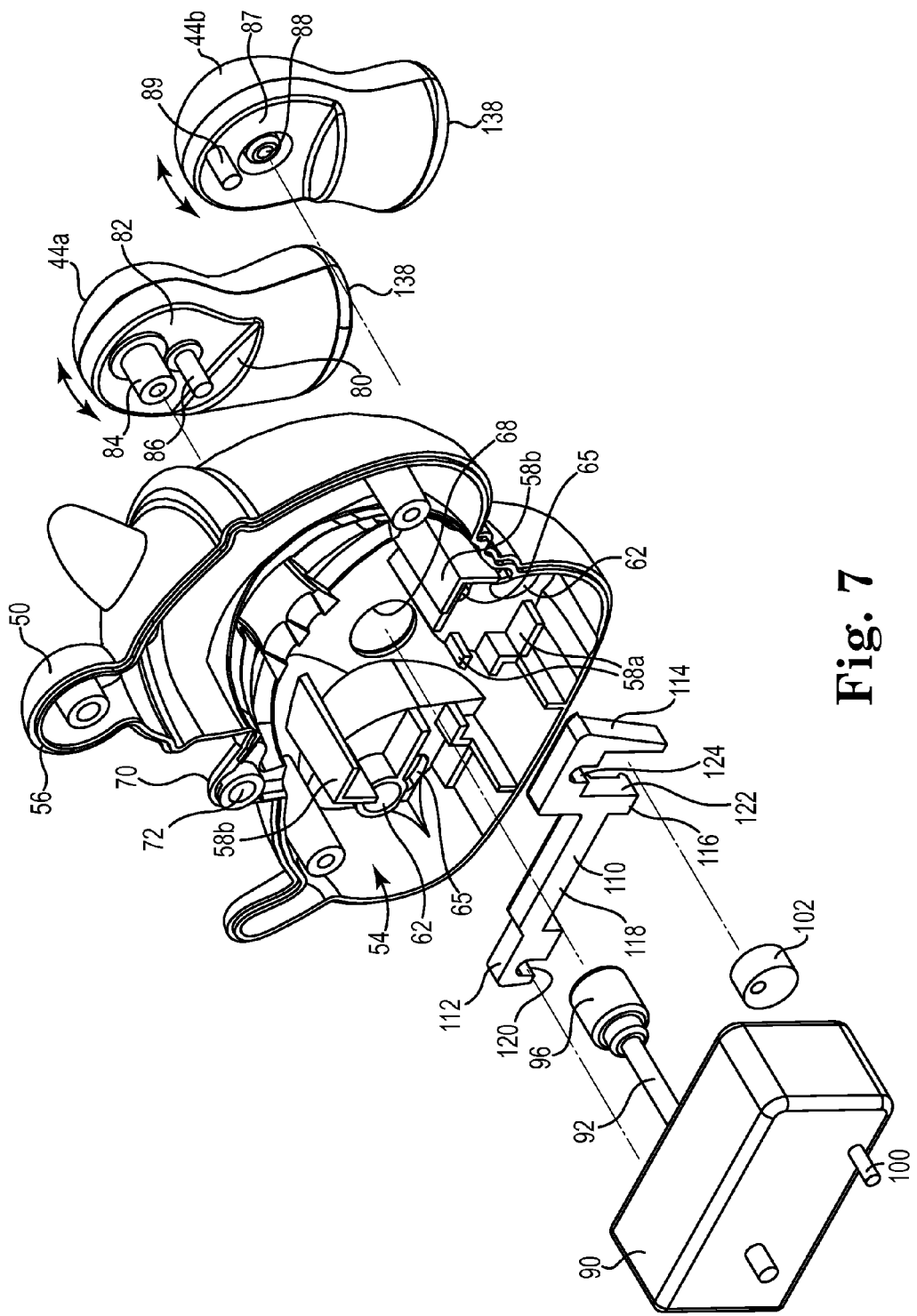
FIG. 7 is partially exploded, perspective view illustration of a portion of the mechanical article of FIG. 6, according to one embodiment of the present invention.

Referring to FIGS. 6 and 7, drive assembly 42 is sized, shaped, and positioned such that drive assembly 42 is substantially fully enclosed within cavity 54 of body 40, more specifically, between first section 50 and second section 52 of body 40. Drive assembly 42 (e.g., a spring-based drive) includes an enclosed gear box 90. Gear box 90 encloses any suitable wind-up, spring driven means as will be apparent to those of skill in the art upon reading this application. An actuating mechanism, in one embodiment, a drive member or actuating rod 92, and cam axles 100 all extend outwardly from and mechanically interact with gear box 90. Actuating mechanism is any suitable member allowing a user to interact with mechanical article 14 to wind or otherwise introduces actuating forces to gear box 90 and, therefore, mechanical article 14. For example, actuating rod 92 extends into gear box 90 and is configured to wind gear box 90 therein against a biasing spring force when actuating rod 92 is rotated about its longitudinal axis. As such, energy from the spring resisting the winding is stored in gear box 90. As such, when user-applied rotational force is removed from actuating rod 92 (i.e., any externally applied resistive force on actuating rod 92 is removed), the biasing spring force (e.g., the stored energy) effectively unwinds gear box 90 inducing rotation of gears and associated members within gear box 90.

In one embodiment, movement induced from "unwinding" of gear box 90 causes cam axles 100, which extends out of gear box 90, to each rotate. In one example, one cam axle 100 extends from each of right and left sides of gear box 90. A cylindrical cam member 102 is coupled to the end of cam axle 100 opposite gear box 90 in a non-concentric manner. For example, cam axle 100 is positioned off-center with respect to cam member 102.

Figure 8:
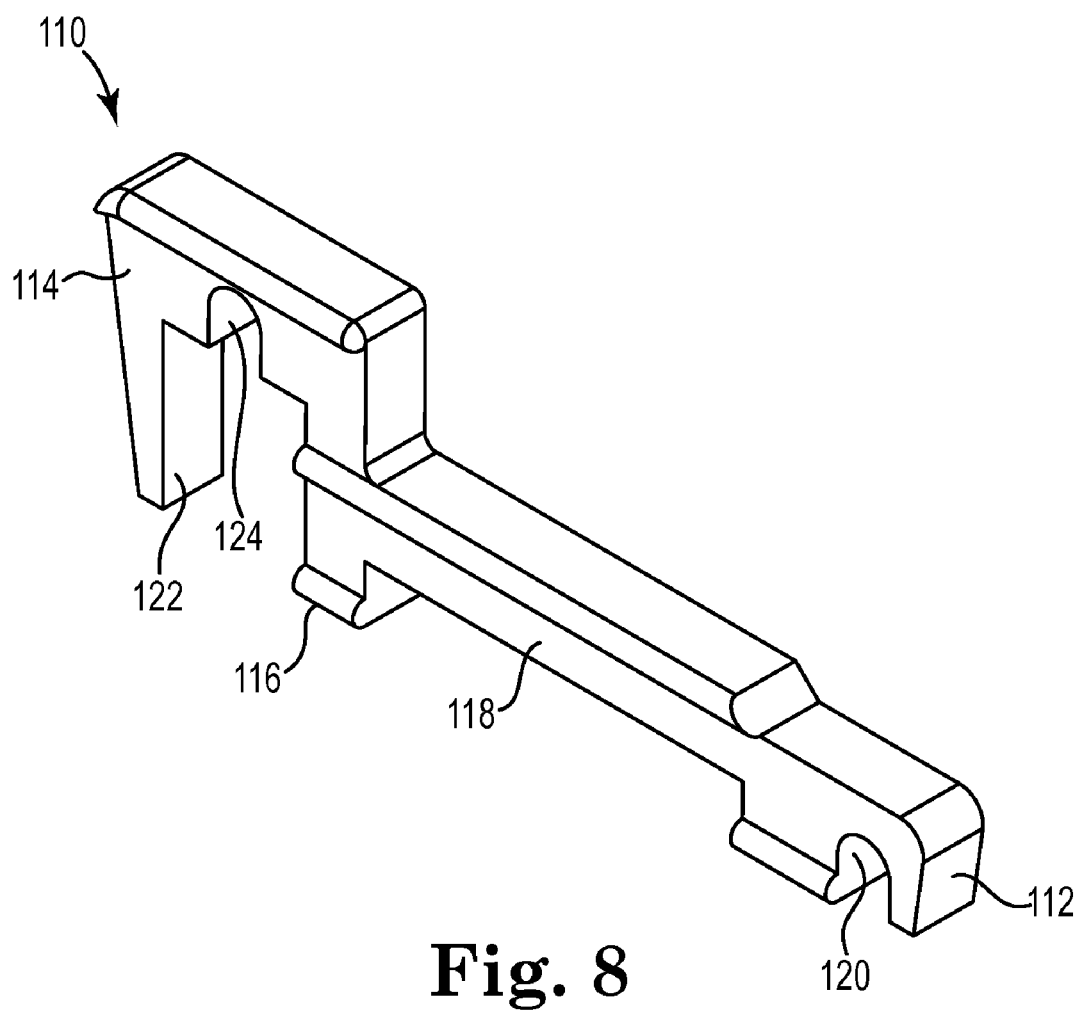
FIG. 8 is a perspective view of a cam follower of the portion of the mechanical article of FIG. 7, according to one embodiment of the present invention.

Drive assembly 42 additionally includes cam followers 110, which each interact with one of cam members 102. Referring to FIG. 8, in one embodiment, each cam follower 110 is substantially elongated and defines a first end 112, an opposite second end 114, and an intermediate bar 118 or segment extending between first end 112 and second end 114. A bottom edge 116 of cam follower 110 is defined along a length of cam follower 110. A notch 120 extends upwardly from bottom edge 116 and is sized and shaped to snugly receive cam member 86 of one of rear legs 44a. In one example, notch 120 extends through an entire thickness of cam follower 110.

As illustrated, in one embodiment, a cutout 122, such as a rectangular cutout, extends upwardly from bottom edge 116 of cam follower near second end 114 of cam follower 110. Each cutout 122 has a length and a width each sized just slightly larger than an outer diameter of one cam member 102 to substantially receive the corresponding cam member 102 therein. More specifically, circumferential surfaces of cam member 102 interface with internal edges of cutout 122. A notch 124 extends from a top edge of cutout 122 and is rounded in shape and sized to relatively snugly receive cam member 89 of one of front legs 44b. In one embodiment, each of cutout 122 and notch 124 extends through an entire thickness of cam follower 110.

In one embodiment, assembly of mechanical article 14 begins by attaching rear legs 44a and front legs 44b to the respective first section 50 and second section 52 of body 40. Rear legs 44a are each aligned with a different one of first section 50 and second section 52 such that hubs 84 and cam members 86 each fit through one of apertures 62 and one of cam reception slots 65, respectively. A connection device (not shown), such as a screw or other suitable attachment member is thread through aperture 62 of the respective first section 50 or second section 52 into a corresponding hub 84 of one of rear legs 44a in a manner allowing each rear leg 44a to rotate about the corresponding connection device and hub 84. Each cam member 86 fits within a corresponding cam reception slot 65 such that when rear leg 44a rotates about its hub 84, cam member 86 slides along cam reception slot 65 and vice versa. In one embodiment, a length of each cam reception slot 65 limits the range of motion of the respective leg 44a as cam members 86 are only free to move within the confines of the respective cam reception slot 65.

Front legs 44b are each aligned with a different one of sections 50 and 52 such that each cavity 88 aligns with a corresponding front one of apertures 62 and each cam member 89 fits through a front one of cam reception slots 65. A connection device (not shown), such as a screw or other suitable attachment member is thread through the corresponding aperture 62 of the respective section 50 or 52 into a corresponding cavity 88 of front leg 44b in a manner allowing front leg 44b to rotate about the connection device. Cam member 89 fits within the corresponding cam reception slot 65 such that when front leg 44b rotates about its corresponding connection device, cam member 89 slides along cam reception slot 65 and vice versa. Similarly to cam reception slots 65 and cam member 86, a length of the respective cam reception slot 65 limits cam member 89 range of motion.

Once legs 44 are coupled with the respective body sections 50 and 52, at least one of cam followers 110 is positioned within one of first section 50 or second section 52, for example, second body section 52. In particular, cam follower 110 is positioned such that first notch 120 receives cam member 86 of rear leg 44a and second notch 124 of the same cam follower 110 receives cam member 89 of front leg 44b. In this manner, cam follower 110 links movement of cam member 86 (and therefore, rear leg 44a) to cam member 89 (and therefore, front leg 44b) that are coupled with first section 50. In one embodiment, when cam follower 110 is so placed, it interacts with coupling features 58 of the corresponding first section 50 or second section 52. More specifically, in one example, cam follower coupling features 58a extend along a top and/or a bottom of intermediate bar 118 to help maintain cam follower 110 in position within cavity 54 when mechanical article 14 is fully assembled and used. In one embodiment, cam follower coupling features 58a generally prevent any substantial movement of cam follower 110 in an up and down direction while still allowing linear translation of cam follower 110 in a front to back direction.

Next, drive assembly 42 is positioned relative to cam follower 110 and second section 52. In particular, cam member 102 is positioned to fit within cutout 122 to interact with interior edges of cam follower 110 immediately adjacent cutout 122. In addition, in one example, gear box 90 of drive assembly 42 is positioned to interact with gear box coupling features 58b defined by left body section 52, which, in one embodiment, interact with gear box 90 to facilitate maintaining the position of gear box within cavity 54 in both a front-to-back direction and an up-and-down position relative to the orientation described with respect to FIGS. 6 and 7.

The remainder of mechanical article 14 is similarly assembled on the right side, with an opposite cam member 102 being positioned in cutout 122 of the remaining cam follower 110, and cam follower 110 being positioned to receive cam members 86 and 89 that extend through first section 50 of body 40. In addition, actuating rod 92 is positioned to extend from gear box 90 out through opening 68 in first section 50, and therefore, out of body 40. In one embodiment, a knob 96 is coupled with an end of actuating rod 92 opposite gear box 90 to facilitate a user in grasping and rotating or otherwise interacting with actuating rod 92. Variations in the above-described assembly process will be apparent to those of skill in the art upon reading the present application. In one embodiment, body 40 and/or other portion of mechanical article 14 includes an account identifier similar to that of transaction card 12 described above such that mechanical article 14 can be used for transactional purposes similar to transaction card 12.

Figure 9:
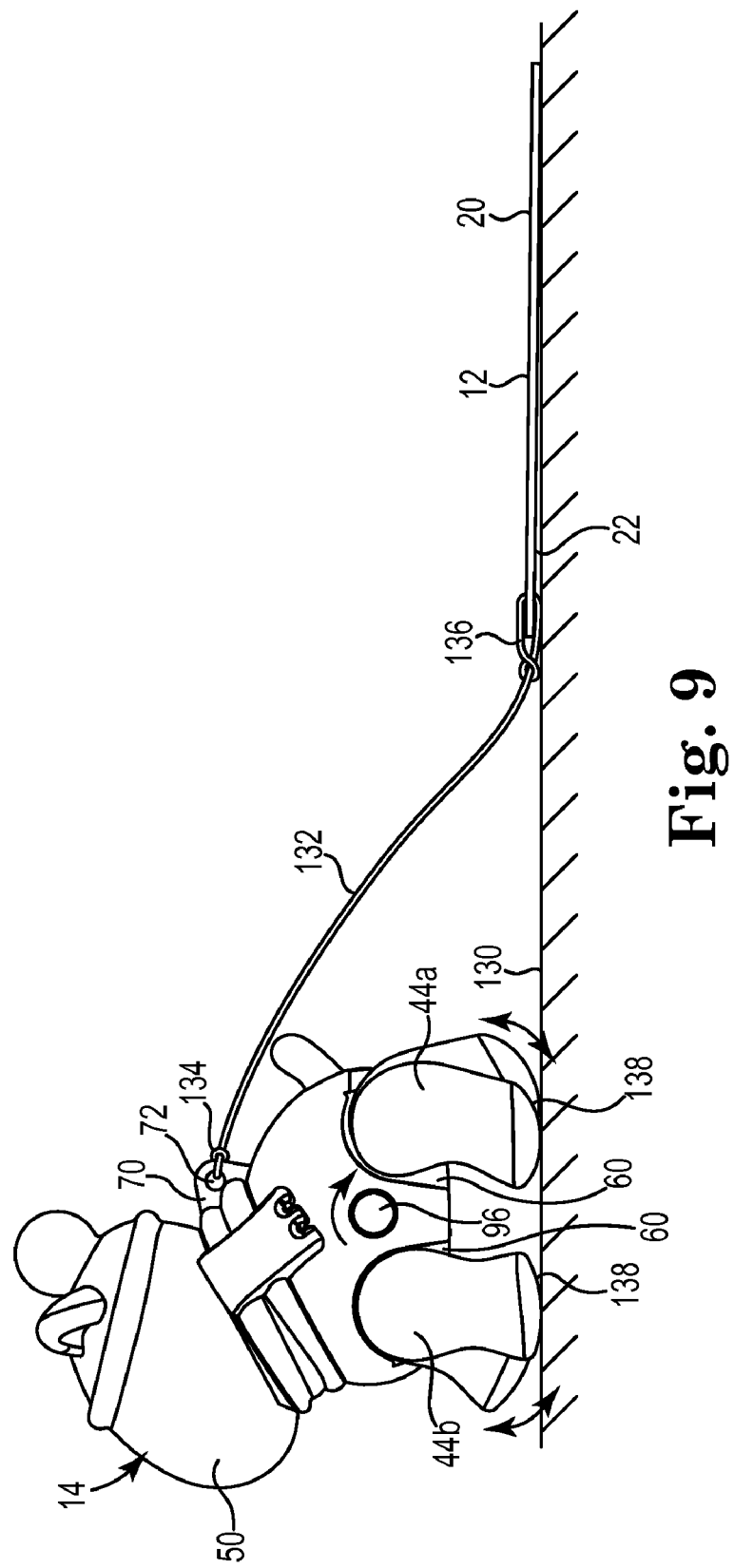
FIG. 9 is a side view illustration of the mechanical article and the transaction product of the transaction product assembly of FIG. 1 during non-transactional use, according to one embodiment of the present invention.

In one embodiment, following assembly, mechanical article 14 is configured to be used as a novelty item to walk across a support surface 130 as generally illustrated with additional reference to FIG. 9. More specifically, following rotation of knob 96 in either a clockwise or counter clockwise direction, gear box 90 is wound. Once the user who rotated knob 96 releases knob 96, then gear box 90 effectively unwinds itself causing cam axles 100 to rotate, which in turn causes cam member 102 to rotate. Since cam member 102 is not coaxially mounted (i.e., is mounted off-center) with respect to cam axle 100, rotation of cam member 102 and interaction between cam member 102 and cam follower 110 causes cam follower to linearly translate front to back and back to front relative to the orientation of mechanical article 14.

Front-to-back movement of cam follower 110 in turn moves cam members 86 and 89 of the corresponding rear legs 44a and front legs 44b to move within reception slots 65 of body 40. Since cam members 86 and 89 are rigidly coupled to the respective rear legs 44a and front legs 44b, movement of cam members 86 and 89 causes rotation of rear legs 44a and front legs 44b about their respective hubs 84 and apertures 62, respectively, as generally illustrated by the lower two arrows in FIG. 9. This movement is repeated on both the right and left sides of body 40 causing body 40 to effectively walk across support surface 130 due to interaction between bottom surface 138 of legs 44 and support surface 130. In one embodiment, when one of cam followers 110 is moved in its most forward position (i.e., nearest the nose of the puppy), the corresponding rear leg 44a is rotated forwardly and the corresponding front leg 44b is rotated rearwardly, such that rear leg 44a and front leg 44b are angled toward one another. Conversely, when one of cam followers 110 is moved in its most rearward position (i.e., nearest the tail of the puppy), the corresponding rear leg 44a is rotated rearwardly and the corresponding front leg 44b is rotated forwardly, such that rear leg 44a and front leg 44b are angled away from one another. In one example, when cam follower 110 is in its most forward position, bottom surface 138 of rear leg 44a and front leg 44b are closest to one another. Conversely, when cam follower 110 is in its most rearward position, bottom surfaces 138 of rear leg 44a and front leg 44b are furthest apart from one another. In one embodiment, mechanical article 14 is assembled such that when rear leg 44a and front leg 44b on the right side of mechanical article 14 are closest together, then rear leg 44a and front leg 44b on the left side of mechanical article 14 are furthest apart and vice versa. The varying position of legs 44 on either side of mechanical article 14 is due to opposing off-center positioning of cam member 102 relative to a respective cam axle 100 on the right side of drive assembly 42 as compared to the positioning of cam member 102 to a respective cam axle 100 on the left side of drive assembly 42 as will be apparent to those of skill in the art upon reading the present application.

As described above, in one embodiment, a first end 134 of an elongated coupling member or thread 132 is tied around protrusion 70 through hole 72. A remainder of thread 132 drags behind mechanical article 14. In one example, a second end 136 of thread 132, opposite first end 134, is configured to be tied to transaction product 12 though aperture 34. Once thread 132 is tied to transaction product 12, a user places rear surface 22 of transaction product 12 and bottom surfaces 138 of mechanical article 14 on support surface 130. When mechanical article 14 is wound and subsequently walks, mechanical article 14 pulls transaction product 12 behind it. In the illustrated embodiment, mechanical article 14 pulling transaction product 12 appears as the snow dog pulling a sled along support surface 130, which, in turn amuses the user.

As illustrated in FIGS. 1-3 and 10, package 16 includes a supporting carrier or backer 140 and a blister member 142. Referring, for example, to the front view of FIG. 10 and the rear view of FIG. 2, backer 140 comprises a single layer or multiple layers of paper or plastic material, for example, generally in the form of a relatively stiff but bendable/flexible card. Use of other materials is also contemplated. In one embodiment, backer 140 defines a front or first surface 150 and a rear or second surface 152 positioned opposite first surface 150, where the front as described with respect to backer 140 refers to a surface configured to face potential consumers when positioned in a retail display. In one example, one or both of first surface 150 and second surface 152 are substantially planar. Backer 140 displays indicia, graphics or text information including store logo(s), store name(s), slogans, advertising, instructions, directions, brand indicia, promotional information, holiday indicia, seasonal indicia, media format identifiers, characters and/or other information.

For example, in one embodiment, backer 140 includes decorative indicia 154, which makes package 16 more aesthetically pleasing to potential consumers, and also ties package 16 to the overall appearance of mechanical article 14 and transaction product 12. For instance, decorative indicia 154 provide background scenery or other related graphics to a common theme of mechanical article 14 and transaction product 12. In the illustrated embodiment, where mechanical article 14 appears as a snow dog and transaction product 12 appears as a sled, decorative indicia 154 relate to snow and other graphics readily associated with winter, cold climates, etc.

In one embodiment, backer 140 includes brand indicia 156, which identify a store, brand, department, etc. and/or services associated with transaction product 12. In one example, backer 140 includes indicia 158 including to, from, and amount fields. The fields of indicia 158 provide areas of backer 140 configured to be written upon by a consumer to personalize backer 140 for presentation as a gift to a particular recipient, for a particular purpose, and/or to indicate a value of transaction product 12.

In one embodiment, backer 140 includes redemption indicia 160, generally indicated by a dashed box in FIG. 2, indicating that transaction product 12 is redeemable for the purchase of goods and/or services and that upon use, a value of the purchased goods and/or services will be deducted from the financial account or record linked to transaction product 12. In one embodiment, redemption indicia 160 include phrases such as "<NAME OF STORE> GiftCard" and "This GiftCard is redeemable for merchandise or services at any of our stores or at our web site," and/or provides help or phone line information in case of a lost, stolen, or damaged transaction product, etc.

Figure 10:
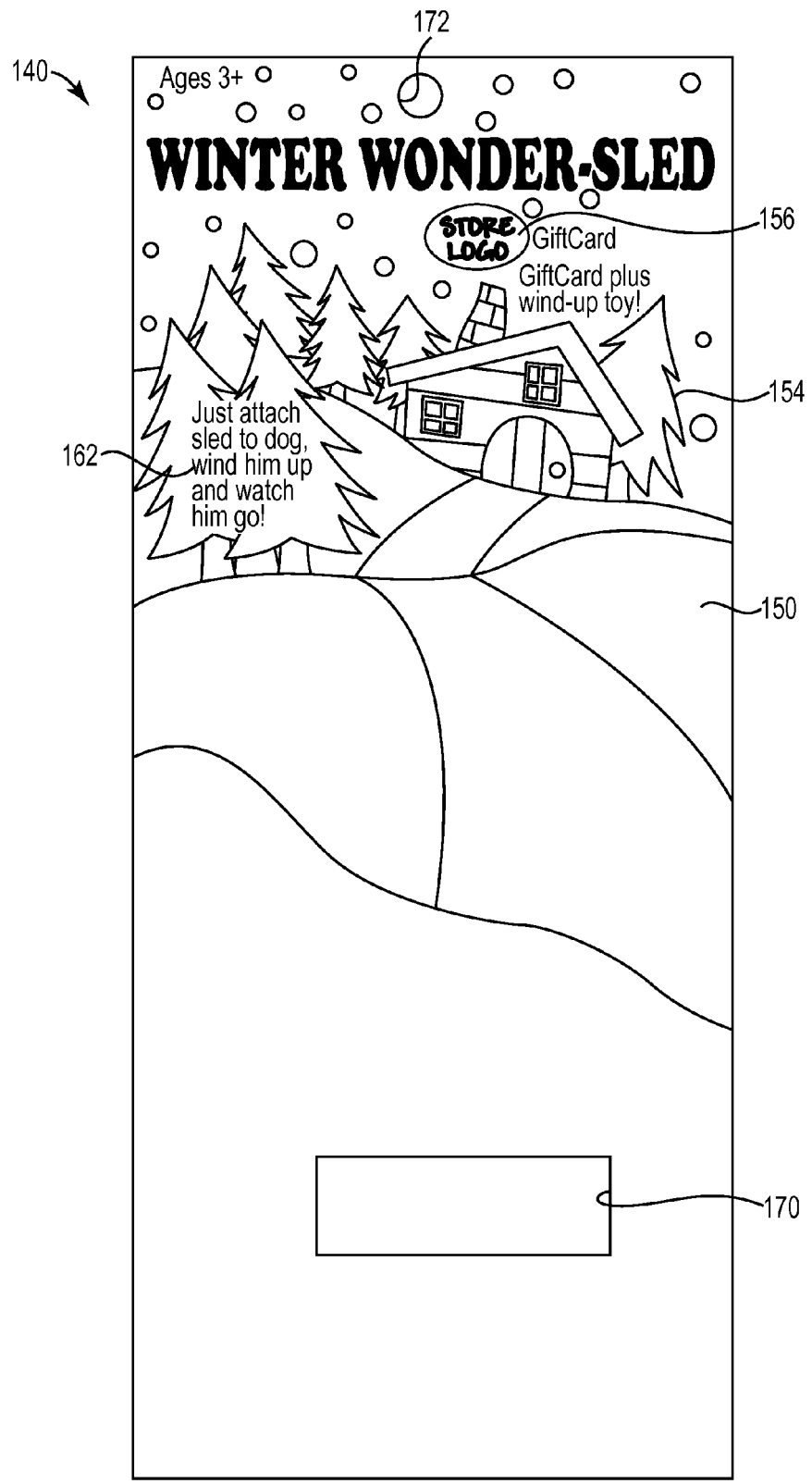
FIG. 10 is a front view illustration of a backer of the transaction product assembly of FIG. 1, according to one embodiment of the present invention.

As illustrated in FIG. 10, in one example, promotional indicia 162 advertise the non-transactional or amusing functionality of transaction product 12. In one embodiment, indicia 162 generally indicate to a bearer of transaction product assembly 10 that upon interaction with mechanical article 12, for example, winding of mechanical article 14, mechanical article 14 will move and/or that transaction product 12 can be coupled with mechanical article 14. As such, indicia 162 further promote the sale of transaction product assembly 10 by drawing the attention of a potential consumer to the non-transactional and amusing feature(s) of transaction product assembly 10.

Any of indicia 28, 30, 32, 38, 154, 156, 158, 160, and 162 account identifier 24 and/or other indicia optionally may appear anywhere on backer 140 or transaction product 12. Additional information besides that specifically described and illustrated herein may also be included and/or one or more of indicia 28, 30, 32, 38, 154, 158, 160, and 162 may be eliminated.

In one embodiment, backer 140 includes a window or opening 170 for displaying account identifier 24 of transaction product 12 therethrough as illustrated in FIG. 2. As previously described, account identifier 24 is adapted for accessing an account or a record associated with transaction product 12 for activating, loading value to or debiting value from the account or record. In one example, transaction product 12 is coupled with or positioned adjacent a front or first surface 150 (FIGS. 1 and 10) of backer 140, and a bearer viewing a rear or second surface 152 (FIG. 2) of backer 140, which is opposite first surface 150, can view or access account identifier 24 through opening 170. Accordingly, opening 170 allows viewing or other access to account identifier 24 to activate and/or load transaction product 12 without removing transaction product 12 from backer 140. In one embodiment, a portion of backer 140 alternatively is configured to be folded away from the remainder of backer 140 to access account identifier 24 without removing transaction product 12 from backer 140. Other foldable or non-foldable backers can be used having various sizes and shapes for supporting transaction product 12.

In one embodiment, backer 140 defines an aperture 172 or hook near a top portion thereof configured to receive a support rod or similar structure in a retail display such that backer 140 can be hung therefrom. Other variations in the formation of backer 140 will be apparent to those of skill in the art upon reading the present application.

Blister member 142 is vacuum formed or otherwise molded from transparent and/or translucent plastic (e.g., polyvinyl chloride) or other suitable material to define a cavity 181 sized and shaped to specifically receive both transaction product 12 and mechanical article 14. In one embodiment, blister member 142, more particularly, is in the form of a shell defining cavity 181 to include a first cavity portion 180 and a second cavity portion 182. A perimeter flange 184 extends around an entirety of blister member 142 to define a substantially planar rear surface 185 of blister member 142. First cavity portion 180 defines a relatively thin section of cavity 181 that extends just slightly in front of first surface 150 of backer 140 where transaction product 12 is a thin card member. First cavity portion 180 is specifically sized and shaped to receive transaction product 12 and to generally maintain transaction product 12 in place within first cavity portion 180 within package 16. In one embodiment, second cavity portion 182 is significantly larger than first cavity portion 180 and is sized and shaped to substantially cover mechanical article 14.

According to one embodiment, second cavity portion 182 is shaped to at least partially follow the curvature of mechanical article 14. In one embodiment, second cavity portion 182 is configured to receive mechanical article 14 in a transverse position such that, for example, right side of mechanical article 14 faces forward in package 16. In one example, second cavity portion 182 defines an aperture 186 through a front surface thereof and positioned to allow a portion of actuating rod 92 to extend from cavity 181 out beyond a front of blister member 142 such that knob 96 is entirely positioned outside of cavity 181.

In one example, second cavity portion 182 is sized and shaped such that mechanical article 14 is suspended from a bottom wall 190 thereof, which extends from a front of second cavity portion 182 back toward first cavity portion 180. An area 188 of second cavity portion 182 extends upward from bottom wall 190 and includes right and left sidewalls 192. Opposite sidewalls 192 are spaced from each other a sufficient distance to allow rear legs 44a and front legs 44b to move between their most forward and most rearward positions without interacting with backer 140 and blister member 142.

Upon assembly, transaction product 12 and mechanical article 14 are placed in first cavity portion 180 and second portion 182, respectively, of cavity 181. In particular, in one embodiment, actuating rod 92 is positioned to extend through aperture 186 and bottom surfaces 138 of legs 44 are spaced from (e.g., above) bottom wall 190 of second cavity portion 182. First surface 150 of backer 140 is positioned adjacent and adhered or otherwise coupled to rear surface 185 of perimeter flange 184. For example, first surface 150 of backer 140 is adhered to rear surface 185 of perimeter flange 184 by heating and applying pressure to activate a heat-seal adhesive on rear surface 185. As a result, mechanical article 14 and transaction product 12 are maintained and substantially enclosed within package 16 between backer 140 and blister member 142.

Mechanical article 14 is suspended above bottom wall 190 via interaction between actuating rod 92 and edges of aperture 186 and/or via compression on mechanical article 14 between blister member 142 and first surface 150 of backer 140. Suspension of mechanical article 14 within cavity 181 and extension of actuating rod 92 outside of package 16 allows mechanical article 14 to be actuated to induce movement of rear legs 44a and front legs 44b. Since rear legs 44a and front legs 44b are suspended, rear legs 44a and front legs 44b are able to move relatively freely within area 188 of cavity 181. In this manner, a potential consumer is able to actuate and observe the resulting movement of mechanical article 14 prior to purchasing transaction product assembly 10 and/or prior to removing mechanical article 14 from package 16. The ability of the potential consumer to observe movement of mechanical article 14 amuses the potential consumer, which, in turn, promotes the sale of transaction product assembly 10.

Figure 11:
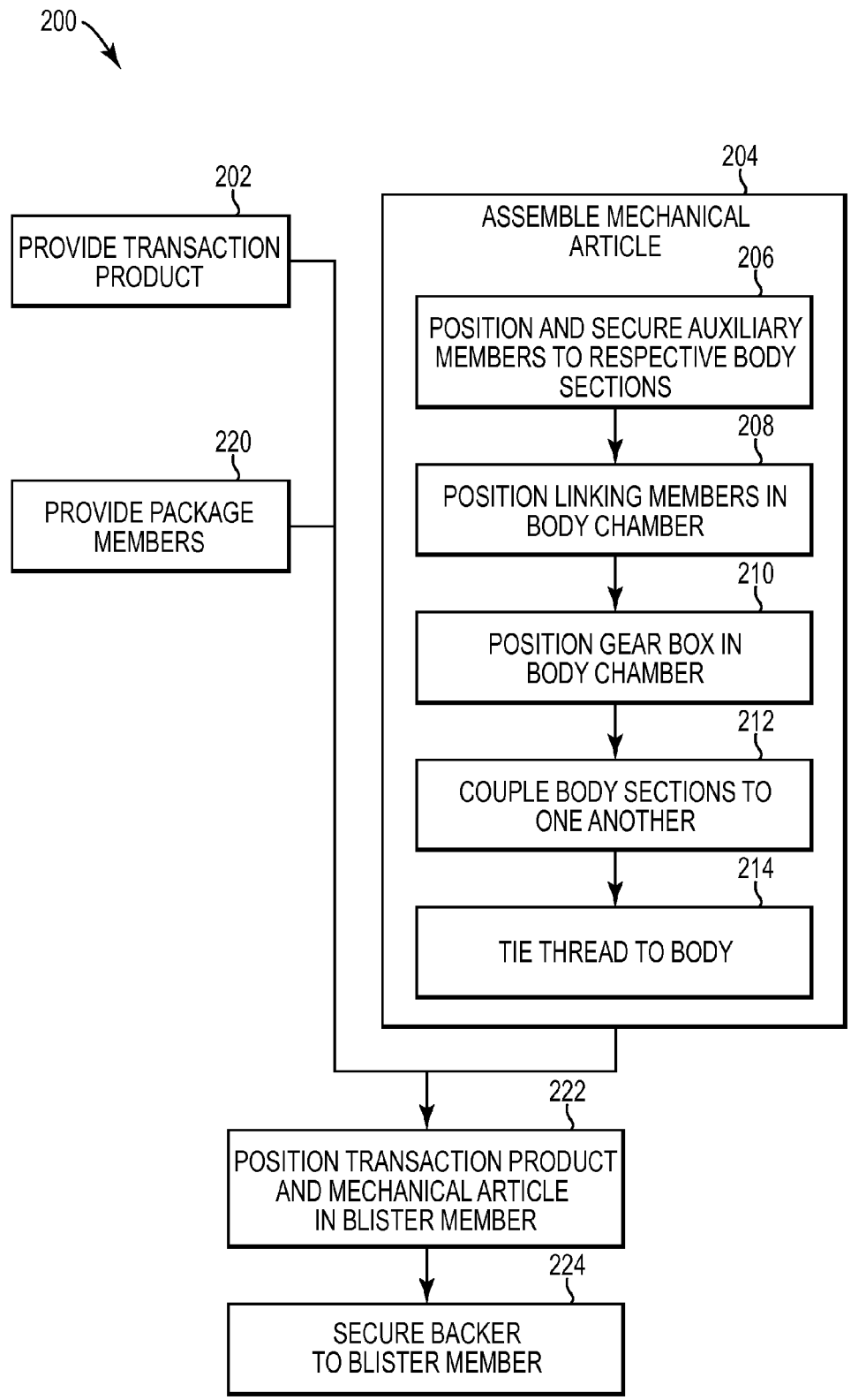
FIG. 11 is a flow chart illustrating a method of assembling a transaction product assembly, according to one embodiment of the present invention.

FIG. 11 is a flow chart illustrating a method of assembling transaction product assembly 10 as generally indicated at 200. At 202, transaction product 12 is provided in any suitable manner such as by manufacturing transaction product 12 and/or receiving transaction product from another party. For example, transaction product 12 is cut from a printed and/or otherwise treated sheet material and includes account identifier 24 and other attributes described above.

At 204, mechanical article 14 is assembled in any suitable manner as will be apparent to those of skill in the art upon reading this application. For instance, in the illustrated example, at 206, legs 44 and/or other auxiliary members are rotatably or otherwise secured to respective portions of body 40, for instance, to one of first body section 50 and second body section 52 as described above or in any other suitable manner. At 208, linking members, such as cam followers 110 linking movement of drive assembly 42, to legs 44 to each other are positioned in one of more first body section 50 and second body section 52. For example, cam followers 110 are positioned to receive cam members 86 and 89 in notches 120 and 124, respectively, to link each rear leg 44a to a corresponding front leg 44b.

Gear box 90 is positioned in body 40 chamber or cavity 54 at 210. In particular, gear box 90 and associated members coupled with gear box 90, such as cam axles 100 and cam members 102 are positioned relative to at least one of first section 50 and second section 52 of body 40. In one example, gear box 90 is positioned within the confines of gear box coupling features 58b and such that each cam member 102 fits within cutout 122 of a corresponding cam follower 110. Then, at 212, first section 50 and second section 52 of body 40 are coupled to each other in a manner aligning any other internal components (additional cam followers 110, etc.) with other internal components and forming a substantially enclosed cavity 54 therebetween. First section 50 and second section 52 are secured to one another in any suitable manner such as by ultrasonically welding or adhering stepped edges 56 to one another and/or extending screws or other connecting members through one of first section 50 and second section 52 and into the other of first section 50 and second section 52. Once assembled, at least one actuating member/portion is accessible by a user from a position external to cavity 54. For example, actuating rod 92 extends from inside gear box 90 outside cavity 54 of body 40 via opening 68.

At 214, thread 132 or other coupling member is optionally secured to body 40 of mechanical article 14, for example, is tied to protrusion 70 through hole 72. In one embodiment, second end 136 of thread 132 is left free for future attachment to transaction product 12 as desired by an end user. While one example method of assembling mechanical article 14 is described with respect to operation 204, it should be understood that other operation sequences or methods of assembling a mechanical article 14 may be used and will be apparent to those of skill in the art upon reading this application.

Members of package 16, for example, backer 140 and blister member 142 are provided at 220. At 222, transaction product 12 and mechanical article 14 are respectively positioned within first portion 180 and second portion 182 of cavity 181 defined by blister member 142, for example, as described above. In one embodiment, actuating rod 92 extends out of body 40 and out aperture 186 in second portion 182. In one embodiment, mechanical article 14 is positioned in second portion 182 such that mechanical article 14 is spaced from bottom wall 190. Accordingly to the illustrated example, blister member 142 is configured such that first portion 180 and second portion 182 space transaction product 12 and mechanical article 14 from one another such that each of transaction product 12 and mechanical article 14 are generally visible through a front of blister member 142. Other configurations are also contemplated.

At 224, rear surface 85 of perimeter flange 184 of blister member 142 is positioned on first surface 150 of backer 140 and secured thereto. For instance, in one example, heat and pressure is applied to perimeter flange 184 and backer 140 to activate heat-seal adhesive on rear surface 85. Other suitable coupling methods may also be used. When fully assembled, both transaction product 12 and mechanical article 14 are visible to potential consumers along with any related decorative indicia 154 or other indicia as described above and as illustrated in FIG. 1. In one embodiment, mechanical article 14 is positioned within package 16 in a manner allowing actuation and demonstrative movement of mechanical article 14 while it remains in package 16. Once fully assembled, transaction product assembly is ready for retail display, etc.

Figure 12:
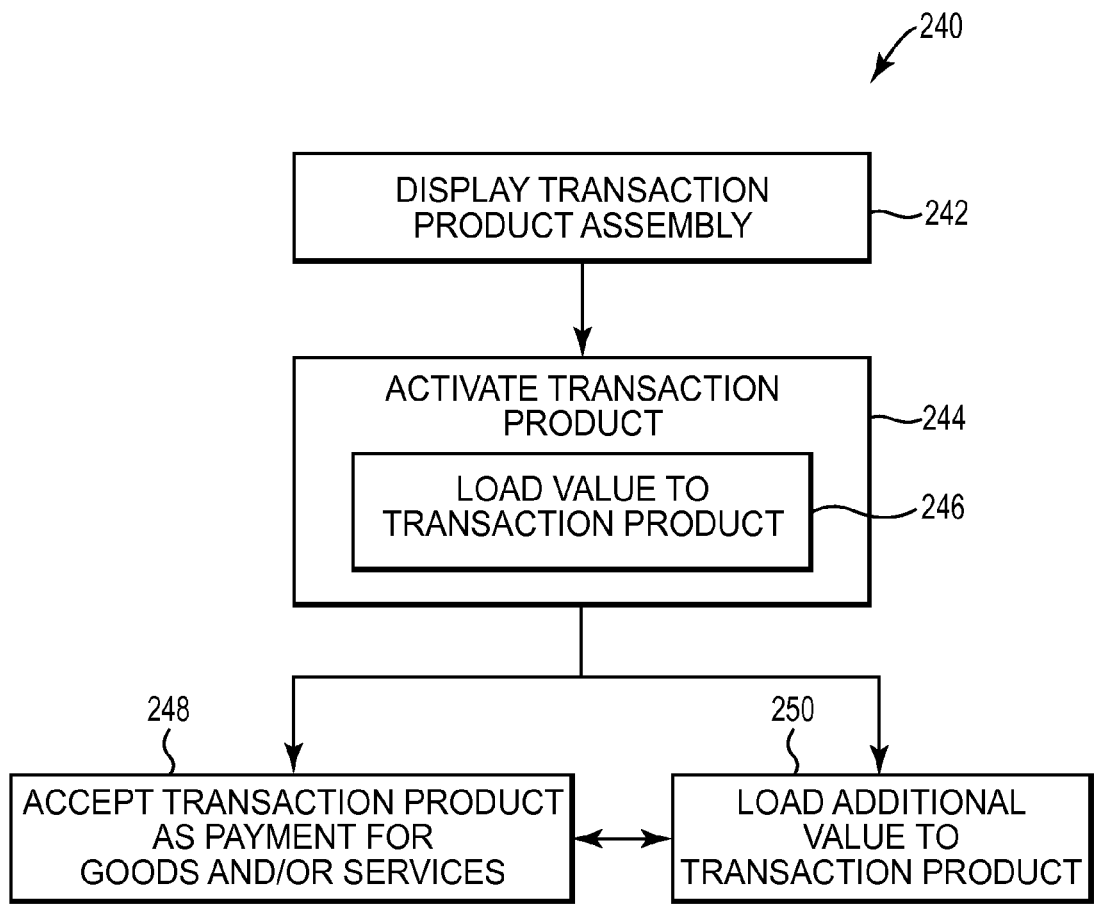
FIG. 12 is a flow chart illustrating a method of encouraging purchase and facilitating use of a transaction product assembly, according to one embodiment of the present invention.

FIG. 12 is a flow chart illustrating one embodiment of a method 240 of encouraging purchase and facilitating use of transaction product assembly 10 by consumers and/or recipients. At 242, transaction product assembly 10 is placed on or hung from a rack, shelf, or other similar device to display transaction product assembly 10 for sale to potential consumers. In one embodiment, transaction product assembly 10 is presented to potential consumers on a retail display such that potential consumers are able to take transaction product assembly 10 from the retail display and interact with the non-transaction features (e.g., the mechanical walking or other movement of mechanical article 14) of transaction product assembly 10 prior to purchasing or otherwise activating transaction product 12. In one embodiment, a depiction of transaction product assembly 10 is additionally or alternatively placed on a website for viewing and purchase by potential consumers.

At 244, a consumer who has decided to purchase transaction product assembly 10 presents transaction product assembly 10 to a retail store employee, retail store kiosk, remote terminal, or other person or device to scan account identifier 24 using a point-of-sale terminal or other machine to access an account or record linked to account identifier 24. In particular, account identifier 24 is scanned or otherwise accessed, for example through opening 170 of backer 140 to activate transaction product assembly 10, more particularly, transaction product 12 and the account or record linked thereto. Upon accessing the account or record, then, at 426, value is added to the account or record in the form of monetary value, points, minutes, etc. Thus, transaction product 12 is activated and loaded.

In one example, a predetermined value is associated with transaction product 12 (i.e., associated with the account or record linked to transaction product 12 via account identifier 24) prior to activation and display, but such predetermined value is not initially available for use toward the purchase or use of goods and/or services. In such an embodiment, at 244, transaction product 12 is activated to permit subsequent access to the predetermined value (e.g., subsequent loading on and debiting from the account or record) and no additional value is added during activation such that operation 246 may be eliminated.

Once transaction product 12 is activated and loaded, transaction product 12 can be used by the consumer or any other bearer of product 12 to purchase goods and/or services at the affiliated retail setting (e.g., a retail store or website) or can be used in exchange for calling minutes, etc. In one embodiment, where transaction product 12 is displayed on a website at 242, then, at 244, transaction product 12 may be activated in any suitable method and may not require the physical scanning of account identifier 24 to be activated or to otherwise access the associated account or record such as at 246.

In one example, at 248, the retail store or other affiliated retail setting or website accepts transaction product 12 as payment toward the purchase of goods and/or services made by the current bearer of transaction product 12. In particular, the value currently loaded on transaction product 12 (i.e., stored or recorded in the account or record linked to account identifier 24) is applied toward the purchase of goods and/or services. At 250, additional value is optionally loaded on transaction product 12 at a point-of-sale terminal, kiosk or other area of the retail store or related setting. Upon accepting transaction product 12 as payment at 248, the retail store or related setting can subsequently perform either operation 248 or operation 250 as requested by a current bearer of transaction product 12. Similarly, upon loading additional value on transaction product 12 at 250, the retail store or related setting can subsequently perform either operation 250 again or operation 248. In one example, the ability to accept transaction product 12 as payment for goods and/or services is limited by whether the account or record associated with transaction product 12 has any value stored or recorded therein at the time of attempted redemption.

Figure 13:
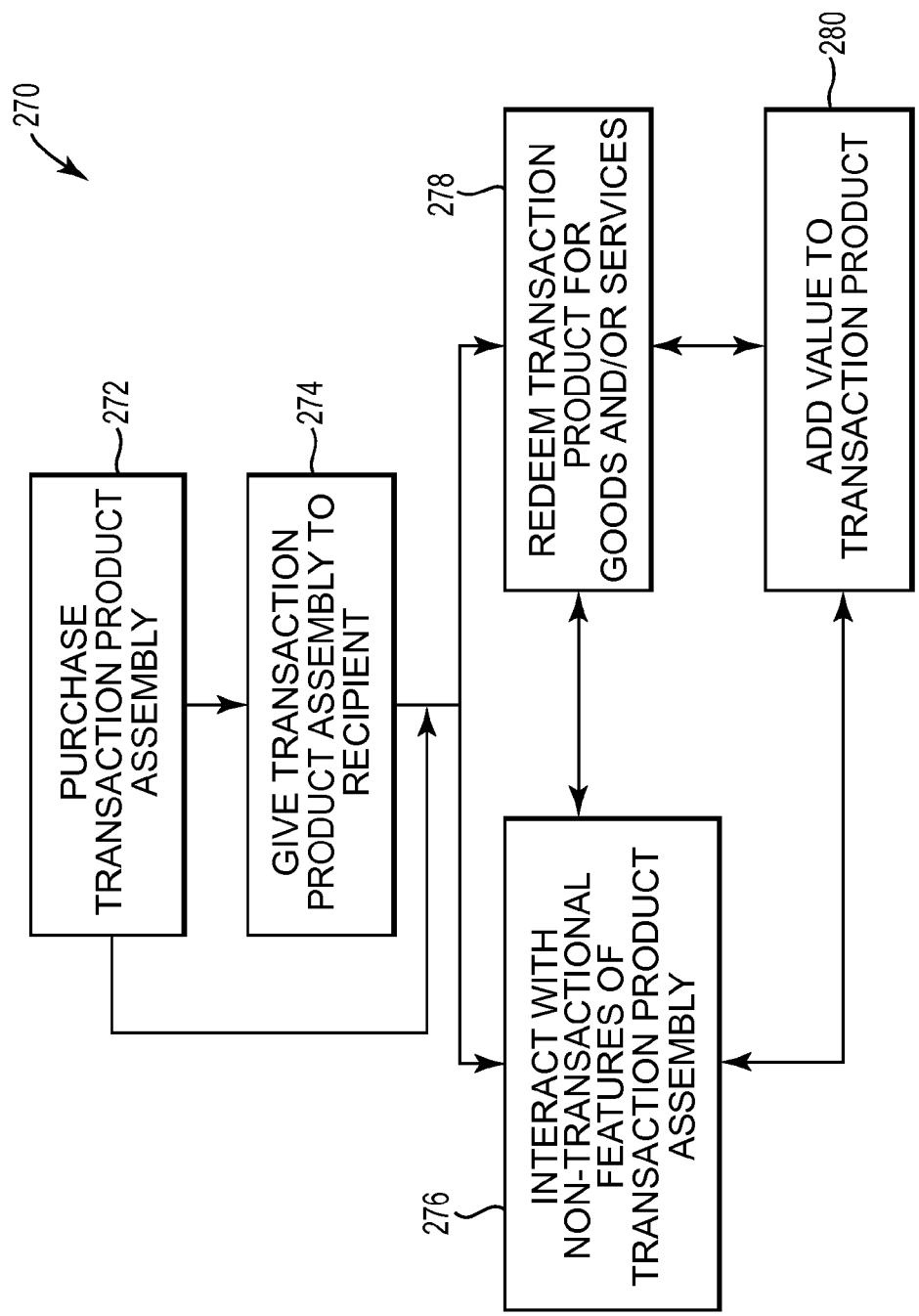
FIG. 13 is a flow chart illustrating a method of using a transaction product assembly, according to one embodiment of the present invention.

FIG. 13 is a flow chart illustrating one embodiment of a method 270 of using transaction product assembly 10 (e.g., FIGS. 1-9). At 272, a potential consumer of transaction product assembly 10, which is displayed in a retail store or viewed on a website, decides to and does purchase transaction product assembly 10 from the retail store or website. Upon purchasing transaction product assembly 10, a retail store employee, a retail store kiosk or other person or device scans account identifier 24 (FIGS. 2 and 4) through opening 170 of backer 140 or otherwise reads or accesses account identifier 24. Upon accessing account identifier 24, the account or record linked to account identifier 24 is accessed and activated to load value onto transaction product 12 (i.e., load value to the account or record associated with transaction product 12). In one embodiment, such as where transaction product assembly 10 is purchased at 272 via a website, actual scanning or other mechanical detection of account identifier 24 may be eliminated.

At 274, the consumer optionally gives transaction product assembly 10 to a recipient, such as a graduate, relative, friend, expectant parents, one having a recent or impending birthday, a couple having a recent or impending anniversary, etc. In one embodiment, a plurality of transaction product assembly 10 are purchased and given to party goers, such as at a birthday party, etc. as party favors or gifts. As an alternative, the consumer can keep transaction product assembly 10 for his or her own use thereby eliminating operation 274.

At 276, the consumer, recipient, or other current bearer of transaction product assembly 10 interacts with the non-transactional features thereof for amusement. More specifically, the bearer of transaction product assembly 10 removes mechanical article 14 from packaging, actuates, and observes resultant movement of mechanical article 14 such as the actuation and movement described above. In one example, interacting at 276 includes coupling transaction product 12 to mechanical article 14 at least temporarily via thread 132 or other suitable component and using mechanical article 14 to pull or otherwise move transaction product 12, for example, as illustrated in FIG. 9. Such use amuses the bearer and any other observers of transaction product 12 and mechanical article 14.

At 278, the consumer or recipient redeems transaction product 12 for goods and/or services from the retail store or website. At 280, the consumer or recipient of transaction product 12 optionally adds value to transaction product 12, more particularly, to the account or record associated with account identifier 24 included therewith, at the retail store or over the Internet (i.e., via the website). Upon interacting with the non-transaction feature of transaction product assembly 10 at 256, redeeming transaction product 12 at 258 or adding value to transaction product 12 at 260, the consumer or recipient of transaction product assembly 10 subsequently can perform any of operations 276, 278, or 270 as desired. In one embodiment, the ability of the consumer or recipient to repeat redeeming transaction product 12 at 278 is limited by whether the account or record linked with transaction product 12 has any remaining value stored or recorded therein at the time of attempted redemption.

Although described above as occurring at a single retail store or website, in one embodiment, purchasing transaction product assembly 10 at 272, redeeming transaction product 12 at 278, and adding value to transaction product 12 at 280, can each be performed at any one of a number of stores adapted to accept transaction product 12 or over the Internet. In one example, a number of stores are each part of a chain or are similarly branded stores. In one example, a number of stores include at least one website and/or at least one conventional brick and mortar store.

In one variation to the above described embodiments, mechanical article 14 itself may be provided with an account identifier similar to account identifier 24 such that mechanical article 14 can be used similarly to transaction product 12 toward the purchase or use of goods and/or services. In this embodiment, transaction product 12 may also be provided and/or may be eliminated.

Transaction cards and other products come in many forms, according to embodiments of the invention. Stored-value cards, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the card is used, encouraging repeat visits or use. The card remains in the user's purse or wallet, serving as an advertisement or a reminder to revisit the associated merchant. Stored-value cards according to embodiments of the invention provide a number of advantages to both the consumer and the merchant. Other stored-value cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction product assembly comprising:
   a transaction product including an account identifier statically connected thereto, wherein the account identifier links the transaction product to at least one of an account and a record and is machine readable by a point-of-sale terminal;
   a mechanical article including a body, an auxiliary member, a drive mechanism, and an actuating mechanism, wherein the drive mechanism is enclosed within the body, the actuating mechanism extends from within the body to a position external to the body, and user interaction with the actuating mechanism is configured to actuate the dive mechanism to induce movement of the auxiliary member relative to the body of the mechanical article after the user completes interaction with the drive mechanism; and
   a coupling member secured to the mechanical article and configured to be secured to the transaction product such that movement of the auxiliary member relative to the body causes corresponding movement of the transaction product.

2. The transaction product assembly of claim 1, wherein the account identifier is a bar code.

3. The transaction product assembly of claim 1, wherein the account identifier includes at least one of a bar code, a magnetic strip, a smart chip, and a radio frequency identification (RFID) device.

4. The transaction product assembly of claim 1, further comprising:
   a package configured to support the transaction product and to substantially enclose the mechanical article while allowing demonstrative movement of the auxiliary member relative to the body of the mechanical article while the mechanical article is substantially enclosed within the package.

5. The transaction product assembly of claim 4, wherein the package includes:
   a molded member defining a cavity for receiving the transaction product and the mechanical article, the molded member being one of transparent and translucent and defining an aperture in communication with the cavity, and wherein the actuating mechanism includes an actuating rod extending from the cavity through the aperture such that the actuating rod is accessible from a position external to the cavity to allow a user to interact with the actuating rod to actuate the mechanical article by inducing movement of the auxiliary member relative to the body of the mechanical article while the mechanical article is enclosed within the cavity of the package.

6. The transaction product assembly of claim 5, wherein the molded member defines a substantially planar, perimeter flange, and the package includes:
   a supporting backer coupled with the perimeter flange of the molded member such that the transaction product and the mechanical article are secured within the cavity between the molded member and the supporting backer.

7. The transaction product assembly of claim 6, wherein the supporting backer includes promotional indicia indicating how the mechanical article and the transaction product are usable together for non-transactional purposes.

8. The transaction product assembly of claim 6, wherein the mechanical article is suspended within the cavity such that the auxiliary member is able to move within the cavity free from substantial contact with either the molded member or the supporting backer while the mechanical article is positioned within the package.

9. The transaction product assembly of claim 6, wherein the supporting backer defines a window aligned with the account identifier of the transaction product such that the account identifier can be read through the window without removing the transaction product from the supporting backer.

10. The transaction product assembly of claim 5, wherein the cavity defines a first portion and a second portion separate from the first portion, the first portion of the cavity houses the transaction product, the second portion of the cavity houses the mechanical article and defines the aperture, and the second portion of the cavity is substantially larger than the first portion of the cavity.

11. The transaction product assembly of claim 1, wherein the mechanical article and the transaction product are both configured to appear as part of a common theme.

12. The transaction product assembly of claim 1, wherein the transaction product is sized and shaped to serve as an accessory for use with the mechanical article.

13. The transaction product assembly of claim 1, wherein the mechanical article appears as an animal.

14. The transaction product assembly of claim 1, wherein the auxiliary member extends from a position enclosed within the body to the position external to the body.

15. The transaction product assembly of claim 1, wherein the auxiliary member and the actuating mechanism are formed separately from one another and communicate with each other indirectly by way of the drive mechanism.

16. The transaction product assembly of claim 1, wherein the transaction product, the mechanical article, and the coupling member are each formed as an entirely separate component.

17. A transaction product assembly comprising:
a transaction product including an account identifier statically connected thereto, wherein the account identifier links the transaction product to at least one of an account and a record and is machine readable by a point-of-sale terminal;
a mechanical article including a body, an auxiliary member, and an actuating mechanism, wherein the actuating mechanism extends from within the body to a position external to the body, and user interaction with the actuating mechanism is configured to induce movement of the auxiliary member relative to the body of the mechanical article; and
a coupling member secured to the mechanical article and configured to be secured to the transaction product such that movement of the auxiliary member relative to the body causes corresponding movement of the transaction product,
wherein the auxiliary member is one of four auxiliary members of the mechanical article, and the four auxiliary members define legs of the mechanical article, and following actuation of the mechanical article via, user interaction with the actuating rod, the mechanical article is configured to move right ones of the legs in directions opposite left ones of the legs such that the mechanical article is configured to walk along a support surface.

18. The transaction product assembly of claim 1, wherein the coupling member is elongated and defines a first end and a second end opposite the first end, the first end is secured to the body of the mechanical article, and the second end is configured to be readily coupled with the transaction product.

19. A stored-value assembly comprising:
means for mechanically walking along a support surface including means for inducing stored energy to the means for mechanically walking such that following removal of a resistive force from the means for inducing stored energy, the means for mechanically walking begins to move;
a stored-value card including means for linking the stored-value card with at least one of an account and a record having a value associated therewith such that the stored-value card can be used as payment toward a purchase of one or more of goods and services, wherein the means for linking is machine readable by a point-of-sale terminal; and
means for supporting the stored-value card and for substantially enclosing the means for mechanically walking, the means for supporting and substantially enclosing being configured to suspend one or more movable members of the means for mechanically walking within a cavity, defined by the means for supporting and substantially enclosing, such that the means for mechanically walking is configured to move similarly to how the means for mechanically walking is configured to move when walking along the support surface while the means for mechanically walking is suspended in the cavity.

20. The stored-value assembly of claim 19, wherein the means for supporting and substantially enclosing is configured such that both the stored-value card and the means for mechanically walking are visible while coupled with the means for supporting and substantially enclosing.

21. The stored-value assembly of claim 19, wherein
the means for mechanically walking includes a hollow shell, an appendage member, and an actuating rod accessible from a position external to the hollow shell, wherein user interaction with the actuating rod is configured to induce movement of the appendage member relative to the hollow shell of the means for mechanically walking; and
means for coupling the means for mechanically walking with the stored-value card when the means for mechanically walking and the stored-value card are removed from the means for supporting and substantially enclosing, such that when the means for mechanically walking moves, the means for mechanically walking pulls the stored-value card.

22. The stored-value assembly of claim 21, wherein the appendage member is one of two or more appendage members, and the means for mechanically walking includes:
means for providing a spring-based drive coupled with the actuating rod, such that interaction with the actuating rod winds the means for providing the spring-based drive;
means for linking movement of two or more of the appendage members to one another; and
rotational means for moving the means for linking in a linear manner to convert rotational movement induced from interaction with the means for providing the spring-based drive to a driving force causing the two or more of the appendage members to move relative to the hollow shell of the means for mechanically walking.

23. A method of encouraging purchase and facilitating use of a stored-value card linked to a record or an account, the method comprising:
displaying the stored-value card and a visibly related wind-up device to a potential consumer, wherein:
the stored-value card is rigidly connected to an account identifier linking the stored-value card to the record or the account having a value associated therewith,
the wind-up device includes a hollow shell, a gear box enclosed within the hollow shell, a drive member extending from the gear box to a position outside the hollow shell, and a plurality of appendage members rotatably and externally coupled to the hollow shell,
rotating the drive member actuates the gear box to induce rotation of the plurality of appendage members relative to the hollow shell, the displaying includes supporting the stored-value card and the wind-up device in a package, the package encloses the wind-up device, and the drive member extends from the wind-up device out of the package via an aperture in the package, and the displaying allows potential consumers to rotate the drive member and subsequently observe demonstrative rotation of the plurality of appendage members relative to the hollow shell while the wind-up device remains in the package; and activating the record or the account linked to the stored-value card to permit subsequent deductions from the value associated with the record or the account for application toward one of a purchase and a use of one or more of goods and services based on the account identifier of the stored-value card.

24. The method of claim 23, wherein displaying the stored-value card to the potential consumer includes promoting that the wind-up device is configured to be coupled with and to pull the stored-value card.

* * * * *